US011262289B1

(12) United States Patent
Ohodnicki, Jr. et al.

(10) Patent No.: US 11,262,289 B1
(45) Date of Patent: Mar. 1, 2022

(54) CORROSION PROXY MATERIAL INTEGRATED SENSOR DEVICES FOR DISTRIBUTED SENSING OF EARLY CORROSION ONSET AND CORROSION QUANTIFICATION

(71) Applicant: Energy, United States Department of, Washington, DC (US)

(72) Inventors: Paul R. Ohodnicki, Jr., Allison Park, PA (US); Malgorzata Ziomek-Moroz, Albany, OR (US)

(73) Assignee: Energy, United States Department of, Washington, DC (US)

( * ) Notice: Subject to any disclaimer, the term of this patent is extended or adjusted under 35 U.S.C. 154(b) by 0 days.

(21) Appl. No.: 15/395,018

(22) Filed: Dec. 30, 2016

(51) Int. Cl.
  *G01N 17/04* (2006.01)
  *G01N 21/94* (2006.01)
  *G01N 22/02* (2006.01)

(52) U.S. Cl.
  CPC ............. *G01N 17/04* (2013.01); *G01N 21/94* (2013.01); *G01N 22/02* (2013.01)

(58) Field of Classification Search
  CPC ......... G01N 17/04; G01N 22/02; G01N 21/94
  See application file for complete search history.

(56) References Cited

U.S. PATENT DOCUMENTS

| | | | | |
|---|---|---|---|---|
| 9,240,254 | B2* | 1/2016 | Schueler | G21K 1/06 |
| 9,518,915 | B2* | 12/2016 | Friedersdorf | G01N 17/04 |
| 2002/0154029 | A1* | 10/2002 | Watters | G01D 5/48 |
| | | | | 340/870.07 |
| 2003/0132760 | A1* | 7/2003 | Bray | G01N 17/00 |
| | | | | 324/637 |
| 2008/0048103 | A1* | 2/2008 | Lee | G01N 21/7703 |
| | | | | 250/227.18 |
| 2008/0204275 | A1* | 8/2008 | Wavering | G01N 17/04 |
| | | | | 340/870.16 |

* cited by examiner

*Primary Examiner* — Akm Zakaria
(74) *Attorney, Agent, or Firm* — Timothy L. Harney; Aaron R. Keith; Michael J. Dobbs (57) ABSTRACT

Embodiments relate to methods, systems and apparatus for detecting corrosion using a detector apparatus with a host component. The method includes a detector apparatus. The detector apparatus includes an energy source; a corrosion proxy thin film that corrodes at a rate where the normalized change of mass of the film over time is greater than the normalized change of mass of the bulk material of the host component in a harsh environment; and the detector, wherein the detector is capable of detecting a change in energy due to corrosion of the corrosion proxy thin film. The method includes exposing the host component and the corrosion proxy thin film to the harsh environment; and detecting a change in energy using the detector due to corrosion of the corrosion proxy thin film.

11 Claims, 7 Drawing Sheets

Figure 5: Example embodiments of distributed sensing with an array of wireless surface acoustic wave based sensors integrated with corrosion proxy materials.

CORROSION PROXY MATERIAL INTEGRATED SENSOR DEVICES FOR DISTRIBUTED SENSING OF EARLY CORROSION ONSET AND CORROSION QUANTIFICATION

STATEMENT OF GOVERNMENT SUPPORT

The United States Government has rights in this invention pursuant to an employer/employee relationship between the inventors and the U.S. Department of Energy, operators of the National Energy Technology Laboratory (NETL).

CROSS-REFERENCE TO RELATED APPLICATIONS

This non-provisional patent application is related to and claims priority from U.S. Provisional Patent Application No. 62/265,796 filed Dec. 10, 2015, the complete subject matter of which is incorporated herein by reference.

BACKGROUND OF THE INVENTION

Monitoring of corrosion in different environments, subsurface environments including natural gas transmission and delivery pipelines, oil and natural gas wellbores and wells infrastructure, geological formations, and offshore underwater reserves for example, is critically important for a range of fossil energy related applications. These applications may include unconventional, deep and ultra-deep oil and natural gas resource recovery through drilling and hydraulic fracturing techniques, environmental monitoring in reservoirs for carbon dioxide ($CO_2$) sequestration, and transmission and delivery of natural gas through the existing natural gas pipeline infrastructure and the like.

Subsurface conditions represent challenging environments for the development and deployment of sensing technologies due to an aggressive combination of temperature and pressure in addition to the presence of chemically corrosive species and a potentially high salinity. An overview of relevant downhole sensing environments is presented below in Table 1, which clearly illustrates that temperatures ranging up to 570° F. (~300° C.) and pressures ranging up to 30,000 psi (~207 MPa) or even higher may be relevant for these applications depending upon the specific environment in question.

TABLE 1

Overview of downhole environments relevant for unconventional, deep, and ultradeep resource recovery.

|  | Bakken | Barnett | Eagle Ford | Fayetteville | Haynesville | Marcellus | Deep/Utradeep |
|---|---|---|---|---|---|---|---|
| Stratigraphic Range | Late Devonian to Upper Mississippia | Mississippian | Cretaceous | Mississippian | Upper Jurassic | Middle Devonian | Various |
| Drilling Range (feet) | 4,500-7,500 | 6,500-8,500 | 4,000-14,000 | 1,500-6,500 | 10,500-13,500 | 5,000-10,000 | 30,000-40,000 |
| Technically Recoverable Gas (TCF) Oil (BbbL) | Oil: 3.6 | Gas 43 | Gas: 40 Oil: 2.9 | Gas: 32 | Gas 75 | Gas: 410 | Gas: 85.88 Oil: 419.88 |
| Temp (F.°) pressure (psi) | Up to 200 5500-5800 | Up to 200 3,000-4,000 | Up to 340 | Up to 180 | Up to 380 Over 10,000 | Up to 180 | Up to 572 Up to 30,000 |
| Potential Monitoring Parameters | Flow, T, P, pH, gas composition, gas saturation | | | | | | |
| Chemicals that downhole sensors may be exposed to | HCl, CaCl, KCl, ZnBr, NaCl, $H_2S$, $CO_2$, $CH_4$, $H_2$ with many of the chemicals in solution at a wide range of pH, with lower pH levels being realized during $CO_2$ sequestration activities. | | | | | | |

Such temperatures and pressures are beyond the limit of most electrical and electronic components used in sensor applications, due in many cases to the instabilities associated with packaging, wires, and interconnects. For this reason, approaches that eliminate the need for electrical components and connections at the sensing location can also eliminate a common mode of failure for conventional sensor devices. Optical based sensing methodologies offer this advantage and can also be advantageous from a safety perspective in the presence of potentially flammable gas and chemical species such as for internal natural gas pipeline monitoring. In particular, sensors that employ fiber-Bragg gratings (FBG) inscribed into specialty optical fibers which are capable of withstanding a subset of the high temperature and high pressure conditions of interest have already been deployed commercially for distributed pressure and temperature sensing. In contrast, optical based sensors for subsurface chemical sensing and corrosion monitoring applications have not yet been widely deployed due in part to the lack of optical sensor elements with useful, reversible, and rapid responses to particular chemical species of interest that are also stable under application relevant conditions. Passive, microwave sensor technologies such as surface acoustic wave devices also offer similar, unique advantages in that they allow for remote and wireless interrogation without the need for electrical wires or contacts at the sensing location but they have also not been widely employed for such applications. Due to their compatibility with scalable semiconductor-based manufacturing techniques, they can be made extremely low-cost and hence are directly applicable for wide-area monitoring based approaches.

SUMMARY

This invention serves to address the need for improved corrosion monitoring in subsurface and other harsh environment conditions by integration of so-called "corrosion proxy" materials with advanced sensor device platforms such as optical fiber and surface acoustic-wave devices for early corrosion onset detection and also corrosion quantification. By selection of a material system that corrodes in a manner which provides an indicator of corrosion in materials that comprise critical infrastructure such as natural gas pipelines, drilling equipment, or well-bores, these materials can be integrated with advanced sensor device platforms to serve as useful proxies that predict conditions and locations for which corrosion is likely to occur so that pro-active action can be taken to prevent costly and potentially hazardous degradation and failure. Optical fiber and passive, microwave sensor platforms such as surface acoustic wave devices are particularly attractive due to the advantages outlined in detail above. Changes in optical, electrical, strain/stress, or even mass properties of the "corrosion proxy" sensing materials as a result of characteristic corrosion reactions can be monitored through these advanced sensor device platforms and used as an early indicator of the onset of corrosion in critical infrastructure.

A broad range of technologies exist for monitoring of corrosion in critical infrastructure at ambient and near-ambient conditions with the most common being traditional electrochemical based corrosion sensors comprised of an electrode, electrical wires, and packaging to form an electrochemical probe. While such approaches are to some degree established and relatively accurate/quantitative, they are not ideally suited for wide area monitoring due to the need for direct electrical connections at the sensing location. Instead, such sensors are intended for detailed and highly quantitative monitoring at a carefully selected location. However, the location of conditions, which can influence the onset of corrosion, cannot be predicted in advance and so alternative and complementary approaches that permit monitoring over wide areas are critically needed. The current invention serves to satisfy this need through integration of "corrosion proxy" materials engineered and/or selected to serve as an indicator of the conditions that signify the onset of corrosion with advanced sensor platforms capable of electrically wireless and distributed monitoring at an inherently low cost.

One embodiment relates to a method for detecting corrosion using a detector apparatus with a host component. The method includes a detector apparatus. The detector apparatus includes an energy source; a corrosion proxy thin film that corrodes at a rate where the normalized change of mass of the film over time is greater than the normalized change of mass of the bulk material of the host component in a harsh environment; and the detector, wherein the detector is capable of detecting a change in energy due to corrosion of the corrosion proxy thin film. The method includes exposing the host component and the corrosion proxy thin film to the harsh environment; and detecting a change in energy using the detector due to corrosion of the corrosion proxy thin film.

Another embodiment relates to a method for detecting corrosion of a host component in a corrosive environment. The method includes selecting a corrosion proxy thin film, where the corrosion proxy thin film has a corrosion rate, such that the normalized change of mass of the corrosion proxy thin film over time is greater than the normalized change of mass of a bulk of a host component in a corrosive environment; and exposing the corrosion proxy thin film to the corrosive environment; and, monitoring the corrosion proxy thin film for corrosion.

Still another embodiment relates to a detector apparatus used with a host component for detecting corrosion of the host component in a corrosive environment. The detector apparatus includes an energy source; a corrosion proxy thin film in communication with the energy source, where the corrosion proxy thin film corrodes at a rate where the normalized change of mass of the film over time is greater that the normalized change of mass of the bulk material of the host component; and a detector, wherein the detector is capable of detecting a change in energy due to corrosion of the corrosion proxy thin film.

In one or more embodiment typical corrosion processes cause a mass change (loss or gain) such that $(\Delta M_{Film}/M_{Film})/\Delta T > (\Delta M_{Bulk}/Mo_{Bulk})/\Delta T$, and/or other corresponding measurable changes in film properties that are suitable for monitoring using optical or surface acoustic wave based devices, for example.

BRIEF DESCRIPTION OF THE DRAWINGS

These and other features, aspects, and advantages of the multiple embodiments of the present invention will become better understood with reference to the following description, appended claims, and accompanied drawings where:

FIG. 1 illustrates examples of corrosion proxy materials including FIG. 1a polycrystalline thin films of the infrastructure material to be monitored, FIG. 1b a thin film of a sacrificial or corrosion resistant coating on a material to be monitored, FIG. 1c a thin film sensitive to a particular corrosive species which is known to result in corrosive conditions while alternative corrosion proxy materials utilizing nanocomposite films consisting of one or more types of nanoparticles are also presented in FIGS. 1d-1f;

FIG. 2 illustrates an optical fiber based embodiment of the sensor to be monitored including FIG. 2a an evanescent wave absorption spectroscopy based approach, FIG. 2b a reflectance probe based approach, and FIG. 2c a cladded transmission probe based approach;

FIG. 3 includes FIG. 3a depicting surface acoustic wave (SAW) device based-sensor platform integrated with corrosion proxy materials in cross-section and FIG. 3b depicting radio frequency (RF) wireless interrogation of a SAW device platform with a functional corrosion proxy layer and another set of interdigitated electrodes to allow for pressure/temperature compensation;

FIG. 4 depicts illustrative embodiments of distributed sensing with an optical fiber integrated corrosion proxy sensor material using FIG. 4a distributed interrogation systems such as an optical backscattering reflectometer and FIG. 4b an optical signal analyzer in conjunction with a laser or a light emitted diode (LED) source for a fiber Bragg grating integrated optical fiber sensor;

FIG. 6 depicts graphs illustrating optical absorbance of 25 nm thick films of Cu and Fe sputter deposited on glass substrates measured before (see FIG. 6a) and after (see FIG. 6b) an ~19-hour exposure test in a NaCl-containing aqueous solution; and FIG. 7 depicts graphs including FIG. 7a illustrating optical absorbance of a 25 nm thick film of Cu sputter deposited on glass substrates measured in-situ during an electrochemical testing experiment at an applied potential of −0.12 V vs Ag/AgCl beyond that of the on-set of corrosion and FIG. 7b illustrating cyclic voltammogram for a Cu film in 0.1 M NaCl.

DETAILED DESCRIPTION OF THE INVENTION

One or more embodiments of the invention may also be utilized in harsh environment, a corrosive environment for example, for monitoring corrosion on such devices as turbines, combustion chambers, nuclear reactors, boilers, oil and natural gas wellbores, natural gas transmission and delivery pipelines, other critical infrastructure and the like.

One or more embodiments of the invention consists of the integration of so-called "corrosion proxy" materials with advanced sensor device platforms for the purpose of early detection of corrosion onset in addition to some corrosion rate quantification in some cases. The advanced sensor device platforms are selected for compatibility with low-cost wireless and/or distributed interrogation methodologies that allow for wide area monitoring. In this method, a proxy material is selected for a particular corrosion monitoring application based upon one or more of the following potential criteria:

1) A corrosion rate where the normalized change of mass of the film over time is greater than the normalized change of mass of the bulk material of the host component in a harsh environment;
2) An optical, electrical, or mass change that occurs before the onset of corrosion in the critical infrastructure to be monitored in response to environmental parameters that will ultimately result in significant corrosion of the critical infrastructure if the condition persists; and
3) A characteristic response to a particular environmental parameter at a level which is known to cause corrosion in the critical infrastructure to be monitored.

Figure 1A:
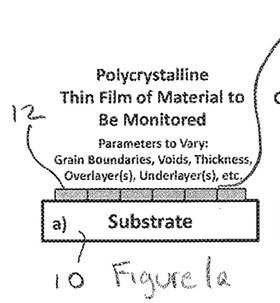
Figure 1B:
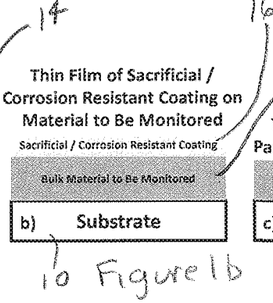
Figure 1C:
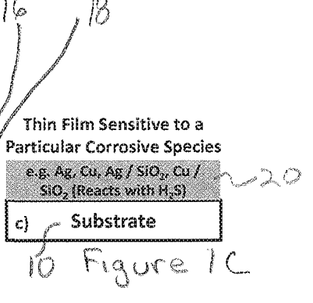

FIGS. 1a-1c provide embodiments of sensing materials used with a substrate 10 that may be employed in the proposed invention. In FIG. 1a, a thin film 12 is employed, shown in contact or integrated with substrate 12 where thin film 12 is of a corresponding material to be monitored for corrosion. Due to well-known accelerated corrosion at defects 14, coupled with a controllable film thickness and microstructure, such thin film variants 12 are expected to exhibit enhanced control over corrosion rates as compared to bulk materials. Because typical corrosion processes cause a mass change (loss or gain) such that $(\Delta M_{Film}/Mo_{Film})/\Delta T > (\Delta M_{Bulk}/Mo_{Bulk})/\Delta T$, and/or corresponding measurable changes in film properties that are suitable for monitoring using optical or surface acoustic wave based devices, for example.

In the embodiment illustrated in FIG. 1b, a thin film of a similar composition as the bulk material is used in conjunction with a metallic overlayer of a sacrificial anodic or a cathodic corrosion-resistant coating 16 that may also be used on the actual bulk material 18 to be monitored. Such a corrosion-resistant coating 16 may also be representative of a protective passivation layer that forms inherently on the surface of a bulk material. Corrosion resistant materials may include any metallic coatings that are more noble than the bulk material including Cu, Ni, Ag, and the like in the case of Fe-based bulk materials. Corrosion resistant materials may also include metallic coatings that are less noble than the bulk material resulting in sacrificial anodic behavior such as Zn, Al, and the like in the case of Fe-based bulk materials. The term "noble" as used here refers to the standard half reaction potentials as is commonly accepted in the literature. Passive layers may include oxides or other compounds that form on the surface of bulk materials to be monitored.

Figure 1D:
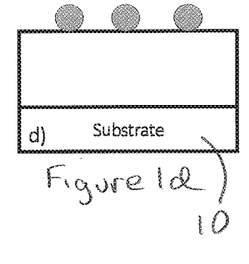
Figure 1E:
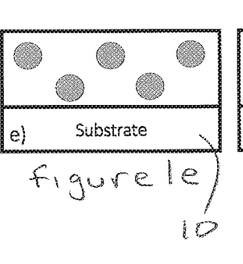
Figure 1F:
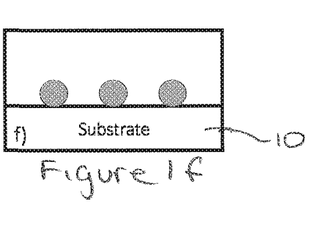

The third example of FIG. 1c illustrates a true proxy material 20 in which a particular sensing material is selected due to a well-known interaction with a key corrosive species or element even if it is not similar to the bulk material system for which corrosion is being monitored. As just a few examples, silver (Ag) and copper (Cu) thin films as well as Ag and Cu/oxide nanocomposite films such as silver/silicon dioxide ($Ag/SiO_2$) are known to have interactions under oxidizing conditions and in the presence of sulfur (S)-containing species. More generally, nanocomposite films comprised of nanoparticles dispersed in a matrix can be used for such applications in which the nanoparticles may provide unique properties to enhance the sensing response such as plasmonic particles Au, Ag, etc. in a matrix where the matrix provides the "early corrosion onset response". Alternatively, the nanoparticles may be specifically selected for their direct corrosion behavior such as nanoparticles similar to the composition of the bulk materials comprising the infrastructure to be monitored. These materials can therefore be used as proxies for early detection of potentially corrosive conditions. Advantages of the nanocomposite film approaches include the ability to tune the optical constants of the constituent sensor layers for optimized integration with optical sensing devices. The approach described here is uniquely suited for early corrosion detection. In some cases corrosion proxy materials may exhibit a corrosion performance that has a well-defined relationship to that of the bulk material. In such cases, a measurement of sensory response as a function of time may also be used to quantify the degree to which critical infrastructure has corroded. FIGS. 1d-1F depict alternative corrosion proxy materials utilizing nanocomposite films consisting of one or more types of nanoparticles.

Figures 2A, 2B:
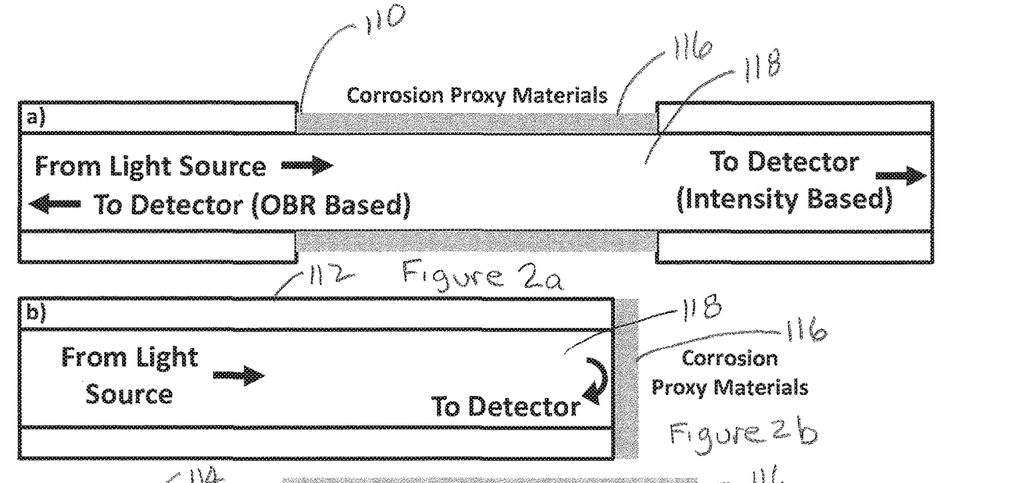
Figure 2C:
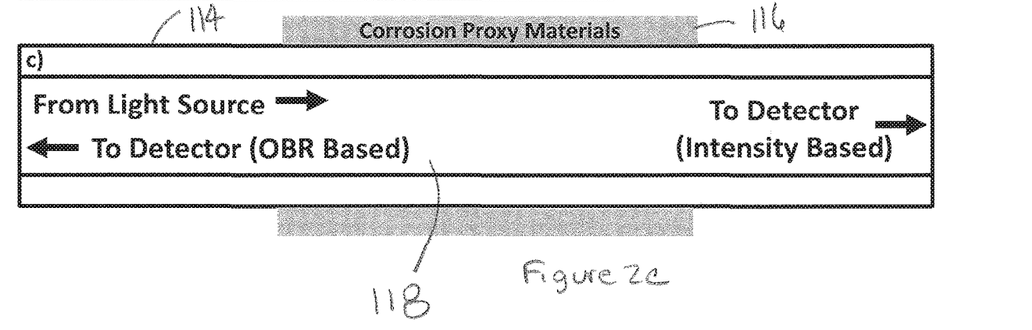

For suitable proxy materials, a range of sensor devices and interrogation strategies can be potentially utilized for optimal application in corrosion monitoring. In the case of optical fiber-based sensors, common methods for integration of corrosion proxy materials are illustrated in FIG. 2 showing evanescent wave absorption spectroscopy based transmission 110 (FIG. 2A), reflectance 112(FIG. 2B), and cladded transmission probe 114 (FIG. 2C) geometries. In the former case (FIG. 2A), the proxy material 116 is coated onto an unclad portion of an optical fiber 118 which allows for direct monitoring of optical property changes in the material. In the last case (FIG. 2C), the proxy material 116 is coated onto a cladded portion of an optical fiber 118 which allows for indirect monitoring of the impacts of the corrosion proxy on the fiber (strain, curvature, etc.) and potentially even the direct optical properties of the film if integrated with long period fiber Bragg gratings or if sufficiently thin claddings and/or high intensity light sources are utilized. A unique advantage of such transmission probe approaches is through integration with well-established distributed interrogation methodologies such as optical backscattering reflectometry and fiber Bragg gratings to allow for monitoring of conditions relevant for early corrosion detection over large distances/areas.

Optical backscattering approaches include optical time domain reflectometry and optical frequency domain reflectometry, and can be based upon a number of potential established scattering mechanisms of light by an optical fiber including Rayleigh, Raman, Brillouin, and others. In many cases, such optical backscattering reflectometry techniques which do not require fiber Bragg gratings are preferred to allow for truly distributed interrogation over the entire fiber length. Eliminating the need for fiber Bragg gratings through the application of optical backscattering reflectometry techniques also simplifies sensor fabrication and cost. When optical backscattering reflectometry and fiber Bragg grating based sensor devices are employed, the source and detector is often located on the same side of the so-called "transmission probe" geometry through appropriate coupling optics as illustrated in FIGS. 2A and 2C. An alternative integration approach is through end-coating a cleaved optical fiber to allow for direct measurement of the film surface reflectance. Due to the simplicity of design and low cost, the reflectance probe geometry may be used in cases where multi-point measurements are not required. However, the transmission probe geometry and particularly the transmission probe geometry combined with optical backscattering techniques that do not require fiber Bragg gratings or long-period fiber Bragg gratings will be preferred in many cases where distributed interrogation and multi-point measurements are essential for wide area monitoring of the bulk infrastructure.

Figure 3A:
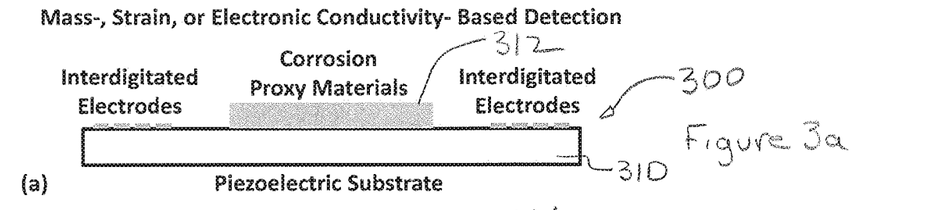
Figure 3B:
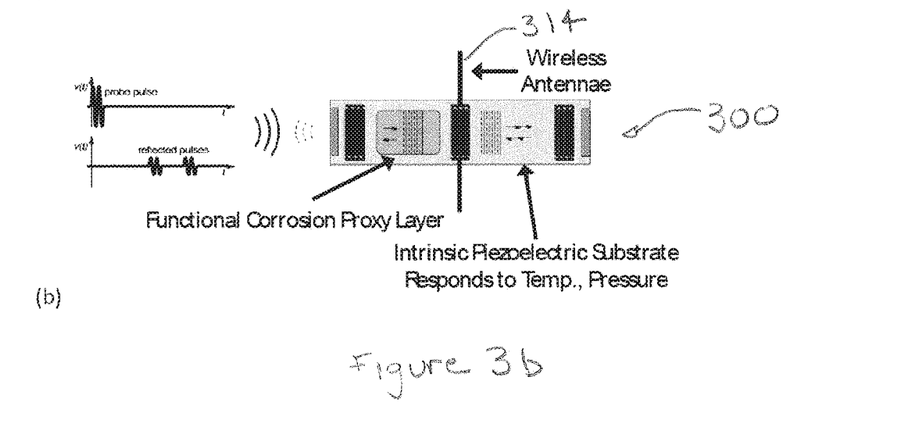

An alternative sensor device platform 300 illustrated schematically in FIG. 3 is the surface acoustic wave (SAW) based device 310 for which functional corrosion proxy layers 312 can also be integrated. In the case of this platform, the sensing mechanism of FIG. 3a can be mass-, electrical conductivity-, and/or strain-based in nature. A unique advantage of this platform consists of the ability to integrate with a wireless antennae 314 thereby enabling wireless and passive interrogation as illustrated in FIG. 3b as well as the ability to make inherently low-cost devices for widespread deployment required for wide area monitoring applications.

Figure 4A:
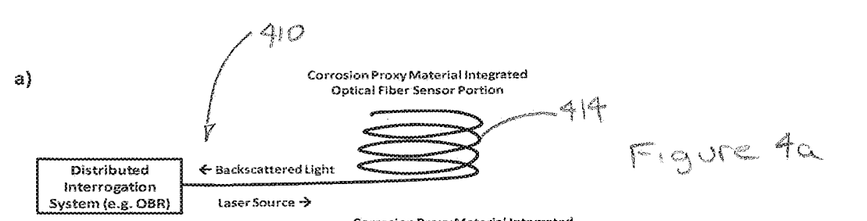
Figure 4B:
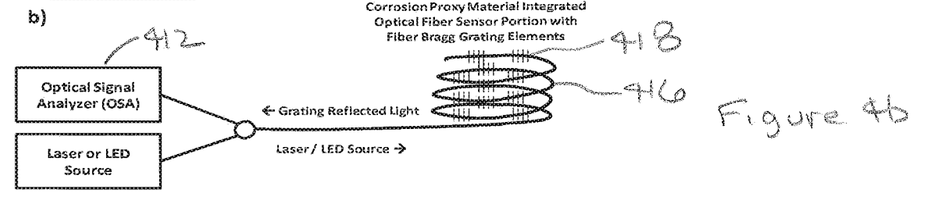

Example setups for distributed interrogation of corrosion detection using the approaches described above are presented below in FIGS. 4 and 5. In the case of FIG. 4, distributed sensing using both (a) an optical backscattering system 410 shown in FIG. 4a as well as (b) an optical signal analyzer 412 are presented shown in FIG. 4b. In the former case, a long region of an optical fiber 414 is coated with a corrosion proxy material in a transmission geometry and interrogated with a high intensity laser source and the backscattered light of a particular wavelength or range of wavelengths is monitored. Using optical time domain or optical frequency domain reflectometry techniques, the response can be measured as a function of position along the fiber. In the case of a response of the corrosion proxy sensor material resulting from corrosion onset or representative conditions that are likely to result in corrosion of the infrastructure to be monitored, a relatively large response is observed to occur in the proximity as a result of the heterogeneity in the optical fiber sensor element. In the latter case, a series of fiber Bragg gratings (FBG) 418 are written into the optical fiber 416 which result in a wavelength localized reflectance at each position that can be integrated with corrosion proxy materials so that modifications to the sensing material result in a modification to the wavelength and/or intensity of the FBG as a result of corrosion onset. In this case, a standard optical signal analyzer can be utilized in conjunction with a laser of high intensity light emitting diode (LED) source.

Figure 5:
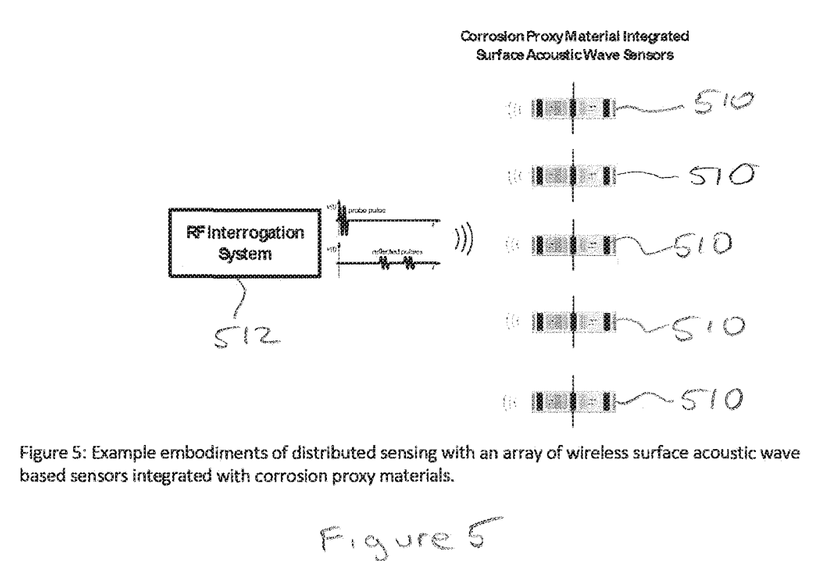
FIG. 5 depicts illustrative embodiments of distributed sensing with an array of wireless surface acoustic wave based sensors integrated with corrosion proxy materials.

In one example embodiment, a cladded optical fiber can be coated with a corrosion proxy material of the type illustrated in FIG. 2C that introduces a well-defined stress onto the optical fiber material which also depends upon the film thickness, mass, and/or other properties in a well-defined manner. Because optical backscattering based interrogation methods are inherently sensitive to the local fiber strain, the corrosion proxy material and hence mass loss can be directly monitored. In many cases, the ability to perform optical backscattering based distributed interrogation without the need for fiber Bragg gratings or long period fiber Bragg gratings is preferred for simplicity of sensor device fabrication as well as the ability to perform truly distributed interrogation rather than only interrogation at the discrete grating based devices. In some cases, multiple fibers may be employed in parallel for the purpose of multi-functional (temperature, strain, chemistry, etc.) sensor capabilities as well as referencing of the corrosion proxy-integrated fiber with a standard fiber that has not been integrated with a corrosion proxy material. In this way, a multi-functional and/or more robust optical fiber based sensor system can be demonstrated. In FIG. 5, an array of corrosion proxy material integrated surface acoustic wave devices 510 is illustrated in which the devices can be interrogated wirelessly through standard RF interrogation systems 512. Responses from individual devices can be detected through sufficiently separate delays in the time domain resulting from a combination of device design and relative proximity to the interrogation system. Alternatively, responses from individual devices can be identified through information contained within the frequency domain as a result of specific design of individual devices for multiplexing of resonant responses at different interrogation frequencies.

As an example of the proposed invention, Cu and Fe thin films were deposited on transparent glass substrates with a thickness of 25 nm using a <3 nm thick tantalum (Ta) adhesion layer on the glass substrate to improve film adhesion during subsequent corrosion testing. Two different types of "simulated corrosion" experiments were performed to clearly demonstrate a pronounced modification in optical properties of the "corrosion proxy" materials as a result of accelerated corrosion relative to bulk metallic alloys. In the first type of experiment, both Cu and Fe films were immersed in a sodium chloride (NaCl)-containing aqueous solution for approximately 19 hours. The optical absorbance of the films was measured using standard transmission spectroscopy based techniques both before and after the exposure testing. A graphic of the experimental results are presented below in FIG. 6 for both the Cu and Fe films.

Figure 6A:
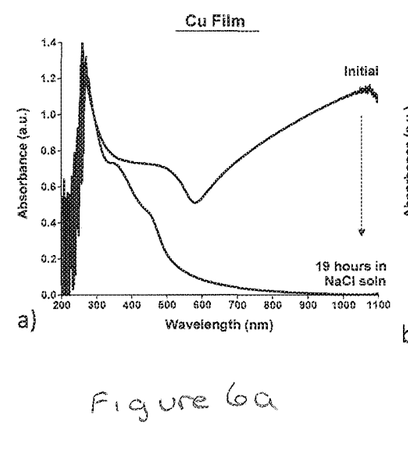
Figure 6B:
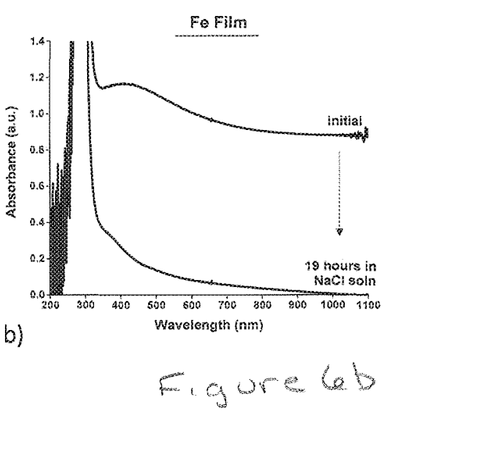

As is clearly illustrated in the optical absorbance spectra presented in FIG. 6a-6b, a pronounced change in optical properties of the Cu and Fe films, respectively, can be resolved as a result of NaCl-containing aqueous solution exposure suggesting the corrosion/oxidation process of the films can be directly monitored using optical spectroscopy based techniques. Although not presented, similar result could be obtained if measured using electrical property measurements as the films become dramatically more insulating after the initial corrosion process. While some degree of metal surface oxidation and/or corrosion would be expected for bulk metallic Cu and Fe under similar exposure conditions, the structural integrity of the bulk metals would remain intact for such short duration exposure. As a result, it is clear that the accelerated corrosion/oxidation of the deposited metallic thin films can serve as a useful and sensitive proxy for the early stages of bulk metallic infrastructure corrosion degradation.

Figure 7A:
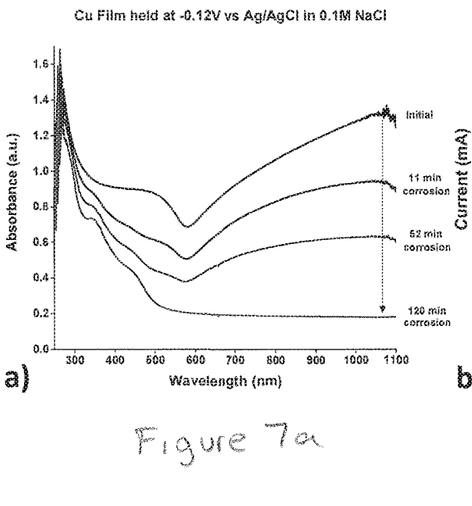
Figure 7B:
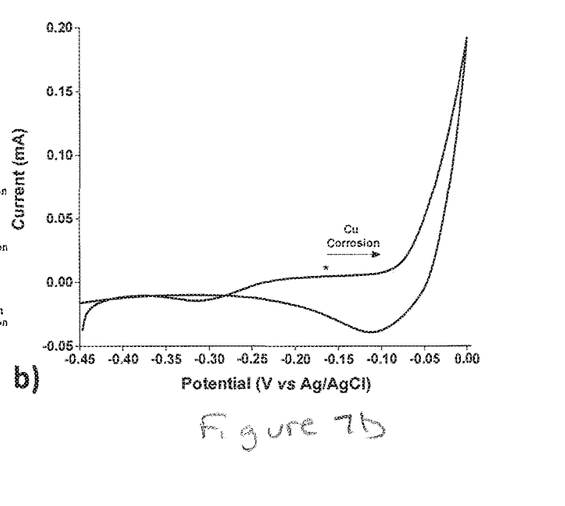

As an even more dramatic demonstration, the deposited Cu films were immersed in a solution and subjected to electrochemical measurements, by applying constant potential and measuring current at a function of time which clearly demonstrated film oxidation and even delamination under the application of high anodic/oxidation polarization potentials. As illustrated in FIGS. 7a-7b, at sufficiently high applied anodic potentials an on-set of corrosion/oxidation can be identified clearly in the measured cyclic voltammograms. Once the applied electrochemical potential lies within this range, a reduction in absorbance can be resolved using in-situ optical spectroscopy during this corrosion accelerated electrochemical experiment thereby confirming the ability to monitor electrochemical corrosion in real-time using optical spectroscopy based techniques. It is of importance to indicate that the measured optical absorbance of the Cu films after 120 min of anodic polarization at −0.12 V measured versus the silver/silver chloride (Ag/Ag/Cl) reference electrode approaches that of the films soaked in the 0.1 M NaCl solution for extended periods of time as presented in FIG. 6a. Once again, the pronounced change in metal film optical properties associated with the oxidation and even the delamination process can readily be monitored using a broad range of distributed optical, surface acoustic wave (SAW), or other types of sensing device platforms to serve as a low-cost and highly sensitive proxy for conditions conducive to early stage of corrosion degradation onset in critical infrastructure.

The new and unique features and advantages of this approach as compared to existing approaches include the following:
1) The ability to measure early corrosion onset using corrosion proxy materials integrated with advanced sensor device platforms.
2) The ability to perform multi-parameter functionality (temperature, strain) in addition to corrosion by leveraging unique advantages of the sensing platforms exploited.
3) The ability to utilize corrosion proxy materials such as thin films of materials comprising the critical infrastructure to be monitored, multilayered thin films including corrosion resistant cathodic or sacrificial anodic metallic layers commonly used on materials to be monitored, and materials that are selectively sensitive to a particular corrosive species of interest.
4) The ability to perform distributed monitoring using either advanced optical or microwave based telemetry and interrogation techniques.
5) The ability to monitor the rate of corrosion through exploitation of alternative corrosion proxy materials.

Possible alternative versions of the invention as compared to the detailed embodiments described in previous sections are as follows:
1) Single layer corrosion proxy materials which are known to provide corrosion data such as mass loss, normalized mass loss as a function of time, corrosion current, and electrical resistance applicable to predicting the corrosion onset of corrosion of the monitored infrastructure and the like.
2) Alternative optical sensor platforms or distributed interrogation methodologies such as long period fiber Bragg grating integrated fibers to allow for monitoring of corrosion proxy materials deposited on the outer cladding of an optical fiber.
3) Distributed optical fiber sensors comprised of multiple corrosion proxy materials or corrosion proxy materials that are also integrated with other types of sensitive materials for monitoring species of interest.
4) Surface acoustic wave based devices comprised of multiple corrosion proxy materials or corrosion proxy materials that are also integrated with other types of sensitive materials for monitoring species of interest.
5) Alternative passive, wireless microwave sensor platforms such as radio-frequency identification (RFID) integrated with corrosion proxy materials or alternative wireless interrogation methodologies.

Embodiments of the invention may be used in corrosion monitoring of a wide range of critical infrastructure including the following:
1) Natural gas pipelines
2) Electricity transmission and distribution networks.
3) Wells and wellbore monitoring.
4) Water pipelines.
5) Bridges and buildings.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

We claim:

1. A method for detecting corrosion using a detector apparatus with a host component:
   the detector apparatus comprising:
   a light source;
   a corrosion proxy thin film in communication with the light source, where the corrosion proxy thin film corrodes at a rate where a normalized change of mass of the corrosion proxy thin film over a time is greater than a normalized change of mass of a bulk material of the host component in a harsh environment;

an optical detector, wherein the optical detector is capable of detecting a change in energy due to corrosion of the corrosion proxy thin film;

an optical fiber in communication with the light source, the corrosion proxy thin film and the optical detector;

the method comprising:

exposing the host component and the corrosion proxy thin film to the harsh environment; and detecting a change in energy using the optical detector due to corrosion of the corrosion proxy thin film, where the optical detector is capable of detecting a change in light transmission through the optical fiber due to corrosion of the corrosion proxy thin film.

2. A detector apparatus used with a host component for detecting corrosion of the host component in a corrosive environment, the detector apparatus comprising:

a light source;

a corrosion proxy thin film comprised of at least one metal embedded in an oxide in communication with the light source, where the corrosion proxy thin film corrodes at a rate where a normalized change of mass of the corrosion proxy thin film over a time is greater that a normalized change of mass of a bulk material of the host component;

an optical detector, wherein the optical detector is capable of detecting a change in energy due to corrosion of the corrosion proxy thin film; and an optical fiber in communication with the light source, the corrosion thin proxy film and the optical detector, wherein the optical detector is capable of detecting a change in light through the optical fiber due to corrosion of the corrosion proxy thin film.

3. The method of claim 1 further wherein the harsh environment comprises a corrosive environment.

4. The method of claim 1 further comprising selecting the proxy thin film based at least in part on the rate of corrosion of the host component.

5. The method of claim 1 wherein the optical detector employs optical backscattering based interrogation without the need for a fiber Bragg grating.

6. The method of claim 1 wherein the optical detector employs corrosion proxy materials integrated with a cladded optical fiber and using optical backscattering based interrogation to monitor local strain at the corrosion proxy location.

7. The method of claim 1 wherein corrosion proxy thin film is comprised of material selected from a group comprising silver, copper, silver oxide nanocomposites, copper oxide nanocomposites, and silver silicon dioxide.

8. The method of claim 1 further comprising integrating the corrosion proxy thin film into the host component.

9. The apparatus of claim 2 wherein the detector is an optical detector employing optical backscattering based interrogation without the need for a fiber Bragg grating.

10. The apparatus of claim 2 wherein the detector is an optical detector employing corrosion proxy materials integrated with a cladded optical fiber and using optical backscattering based interrogation to monitor local strain at the corrosion proxy location.

11. The apparatus of claim 2 wherein corrosion proxy thin film is comprised of material selected from a group comprising silver, copper, silver oxide nanocomposites, Copper oxide nanocomposites, and silver silicon dioxide.

* * * * *